(12) United States Patent
Kale et al.

(10) Patent No.: US 10,100,689 B2
(45) Date of Patent: Oct. 16, 2018

(54) SYSTEMS AND METHODS FOR DESULFATION OF AN OXIDATION CATALYST FOR DUAL FUEL ENGINES

(71) Applicant: Cummins Inc., Columbus, IN (US)

(72) Inventors: Prachetas A. Kale, Pune (IN);
Timothy P. Lutz, Columbus, IN (US);
Junhui Li, Columbus, IN (US); Ashok Kumar, Columbus, IN (US); Krishna Kamasamudram, Columubs, IN (US);
C. Larry Bruner, Greenwood, IN (US)

(73) Assignee: Cummins Inc., Indianapolis, IN (US)

( * ) Notice: Subject to any disclaimer, the term of this patent is extended or adjusted under 35 U.S.C. 154(b) by 206 days.

(21) Appl. No.: 15/076,213

(22) Filed: Mar. 21, 2016

(65) Prior Publication Data

US 2016/0281619 A1  Sep. 29, 2016

Related U.S. Application Data

(60) Provisional application No. 62/139,376, filed on Mar. 27, 2015.

(51) Int. Cl.
*B01D 53/94*  (2006.01)
*F01N 13/00*  (2010.01)
(Continued)

(52) U.S. Cl.
CPC ....... *F01N 3/0885* (2013.01); *B01D 53/9495* (2013.01); *F01N 3/103* (2013.01);
(Continued)

(58) Field of Classification Search
CPC ........ B01D 53/9495; B01D 2255/1021; B01D 2255/1023; B01D 53/944; B01D 53/9477; F01N 13/0093; F01N 3/0885; F01N 3/103; F01N 3/106; F01N 3/2033; F01N 3/2066; F01N 9/00; F01N 2260/04; F01N 2430/06; F01N 2560/023; F01N 2560/06; F01N 2560/14; F01N 2610/02; F01N 2900/1402;
(Continued)

(56) References Cited

U.S. PATENT DOCUMENTS 6,978,601 B1  12/2005  Twigg
7,533,523 B2  5/2009  Wang et al.
(Continued)

OTHER PUBLICATIONS

Laroo, Christopher et al. "NOx Adsorber Desulfation Techniques for Heavy-Duty On-Highway Diesel Engines", U.S. EPA Office of Transportation and Air Quality, Jan. 2002 , 14 pgs.

*Primary Examiner* — Brandon Lee
(74) *Attorney, Agent, or Firm* — Taft Stettinius & Hollister LLP

(57) ABSTRACT

A system and method are disclosed for desulfating an oxidation catalyst in an aftertreatment system of a multifuel internal combustion engine. The oxidation catalyst can be desulfated in response to one or more desulfation triggering events. The desulfation process includes providing hydrocarbons from one or all of the multiple fuel sources to an upstream oxidation catalyst. The hydrocarbons react with the exhaust gas within the upstream oxidation catalyst to deplete oxygen in the exhaust flow to thereby reduce the desulfation temperature of the oxidation catalyst while elevating a temperature of the exhaust gas to a desulfation temperature range.

16 Claims, 5 Drawing Sheets

(51) Int. Cl.
F01N 3/08 (2006.01)
F01N 3/10 (2006.01)
F01N 3/20 (2006.01)
F02D 41/00 (2006.01)
F02D 41/02 (2006.01)
F02D 41/40 (2006.01)
F01N 9/00 (2006.01)
F02D 19/06 (2006.01)

(52) U.S. Cl.
CPC .......... *F01N 3/106* (2013.01); *F01N 3/2033* (2013.01); *F01N 3/2066* (2013.01); *F01N 9/00* (2013.01); *F01N 13/0093* (2014.06); *F02D 19/06* (2013.01); *F02D 41/0025* (2013.01); *F02D 41/024* (2013.01); *F02D 41/027* (2013.01); *F02D 41/405* (2013.01); *B01D 53/944* (2013.01); *B01D 53/9477* (2013.01); *B01D 2255/1021* (2013.01); *B01D 2255/1023* (2013.01); *F01N 2260/04* (2013.01); *F01N 2430/06* (2013.01); *F01N 2560/023* (2013.01); *F01N 2560/06* (2013.01); *F01N 2560/14* (2013.01); *F01N 2610/02* (2013.01); *F01N 2900/1402* (2013.01); *F01N 2900/1404* (2013.01); *F02D 2200/0818* (2013.01); *Y02T 10/24* (2013.01); *Y02T 10/26* (2013.01); *Y02T 10/36* (2013.01); *Y02T 10/44* (2013.01); *Y02T 10/47* (2013.01)

(58) Field of Classification Search
CPC ............. F01N 2900/1404; F02D 19/06; F02D 41/0025; F02D 41/024; F02D 41/027; F02D 41/405; F02D 2200/0818; Y02T 10/24; Y02T 10/26; Y02T 10/36; Y02T 10/44; Y02T 10/47
See application file for complete search history.

(56) References Cited

U.S. PATENT DOCUMENTS

| | | | |
|---|---|---|---|
| 7,721,535 B2 | 5/2010 | Ruth et al. | |
| 7,875,573 B2 | 1/2011 | Beutel et al. | |
| 8,302,387 B2 | 11/2012 | Santhanam et al. | |
| 2005/0153828 A1* | 7/2005 | Uekusa | F01N 3/023 502/60 |
| 2009/0320449 A1* | 12/2009 | Beutel | B01J 23/44 60/274 |
| 2010/0147262 A1* | 6/2010 | Martin | F02D 19/0647 123/299 |
| 2011/0047968 A1* | 3/2011 | Santhanam | F01N 3/103 60/274 |

\* cited by examiner

SYSTEMS AND METHODS FOR DESULFATION OF AN OXIDATION CATALYST FOR DUAL FUEL ENGINES

CROSS-REFERENCE TO RELATED APPLICATION

The present application claims the benefit of the filing date of U.S. Provisional Application Ser. No. 62/139,376 filed on Mar. 27, 2015, which is incorporated herein by reference.

TECHNICAL FIELD

The present disclosure generally relates to desulfation of oxidation catalysts in aftertreatment systems of multifuel engines, such as an oxidation catalyst of a dual fuel internal combustion engines.

BACKGROUND

Multifuel engines include any type of engine that is designed to burn multiple types of fuels at different times of operation. For example, dual fuel internal combustion engines use a liquid fuel, such as diesel fuel, and a gaseous fuel, such as natural gas, as fuels, and they nominally run under lean operating conditions. Hydrocarbons in the exhaust from dual fuel engines include short chain alkanes such as methane, ethane, or propane. The amount of hydrocarbons in the exhaust from dual fuel engines increases as the substitution rate of gaseous fuel for liquid fuel increases. In addition, certain fuels, such as diesel fuel and natural gas, contain sulfur that is released into the exhaust as $SO_2$ and $SO_3$, collectively referred to as $SO_x$ herein.

In order to meet emission regulations, hydrocarbons in the exhaust of a dual fuel engine must be lowered using an appropriate oxidation catalyst in the exhaust aftertreatment system of the engine. However, oxidation catalysts that are effective in oxidizing short chain alkanes may also be sensitive to sulfur levels in the exhaust, which could cause deterioration and/or deactivation of the oxidation catalyst over time as the oxidation catalyst is exposed to the $SO_x$ and other contaminants. Accordingly, there remains a need for further contributions in this area of technology.

SUMMARY

Systems and methods are disclosed for desulfation of an oxidation catalyst used in an aftertreatment system of a multifuel engine such as dual fuel internal combustion engines. According to at least one aspect of the present disclosure, an upstream oxidation catalyst consumes excess measured oxygen in the exhaust gas by providing hydrocarbons to the exhaust gas upstream of the upstream oxidation catalyst, elevating the exhaust gas temperatures passing through the upstream oxidation catalyst and enabling lower temperature desulfation of a second downstream oxidation catalyst. In certain embodiments, the system may include an upstream oxidation catalyst with a platinum-rich content, and a second oxidation catalyst downstream of the first oxidation catalyst with a palladium-rich content. In a further embodiment, the amount and/or content of the hydrocarbons that are provided are determined in response to an oxygen amount in the exhaust gas, the exhaust temperature, and the mass flow rate of the exhaust gas.

According to another aspect, systems and methods are disclosed for desulfation of a palladium-rich oxidation catalyst in response to a desulfation triggering event indicating a sulfur contamination condition of the palladium-rich oxidation catalyst. The desulfation triggering event can be one or more of a time-based desulfation triggering event in response to a duration of engine operation; a time and temperature history based desulfation triggering event determined in response to a time of operation of the oxidation catalyst and/or engine above a temperature threshold associated with sulfur production in the exhaust gas; a sensor based desulfation triggering event determined in response to an output indicating a sulfur accumulation of the palladium-rich oxidation catalyst exceeds a threshold amount; a predicted sulfur contamination condition desulfation triggering event determined in response to feedback from one or more sensors associated with the aftertreatment system and/or engine indicating a sulfur production by the engine; and an estimated sulfur contamination condition desulfation triggering event determined in response to an intrusive diagnostic of the palladium-rich oxidation catalyst.

As used herein, a platinum-rich oxidation catalyst can include platinum without palladium, or a platinum content that is greater than its palladium content. A palladium-rich oxidation catalyst can include palladium without platinum, or a palladium content greater than its platinum content. In addition, unless specified otherwise, the upstream oxidation catalyst is platinum-rich and the downstream oxidation catalyst is palladium-rich. The upstream and downstream catalysts can be separate catalyst devices in separate housings, separate catalyst devices in a common housing, or a single catalyst element with washcoats, coatings, or structures in which the platinum-rich washcoat, coating or structure is upstream of the palladium-rich washcoat, coating or structure.

This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
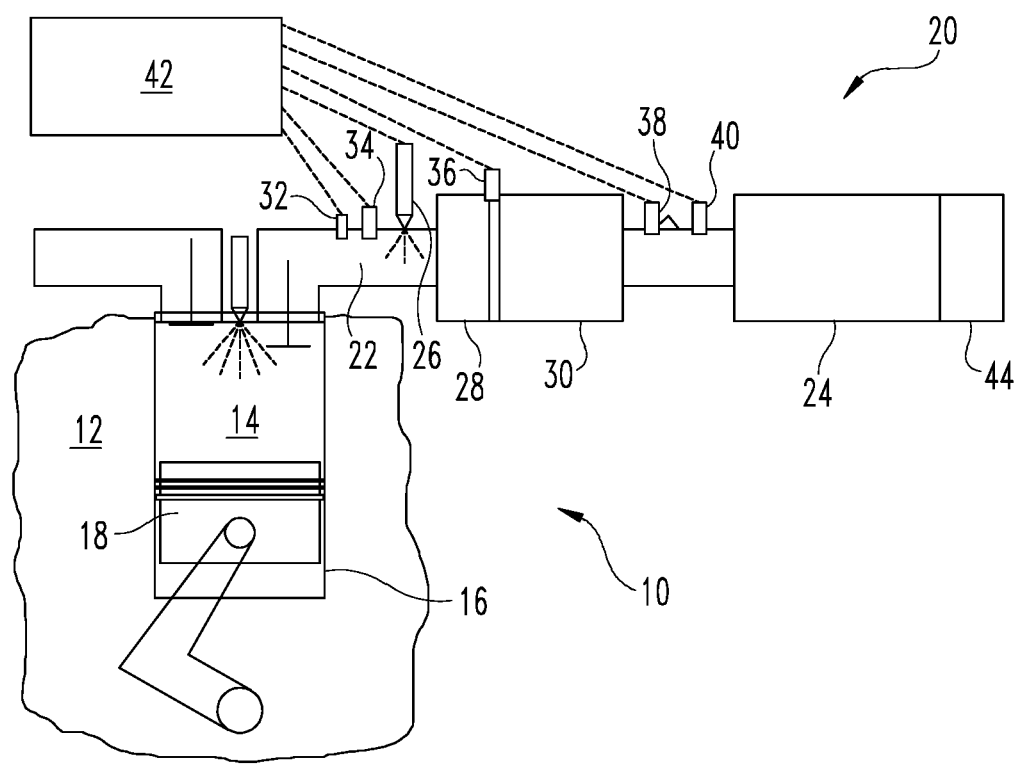
FIG. 1 is a schematic view of one exemplary embodiment of a dual fuel internal combustion engine and aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Many engines in use today need to meet stringent emissions standards, which requires controlling non-methane hydrocarbon emissions along with other pollutants like carbon monoxide, nitrogen oxides (NOx), and particulate matter. Accordingly, engines may use aftertreatment systems to reduce engine-out emissions (i.e., exhaust gases emitted by the engine) to allowable regulatory levels before release to the atmosphere, particularly lean-burn engine systems such as dual fuel engines. Such aftertreatment systems may include one or more of a oxidation catalyst, three-way catalyst, lean $NO_x$ catalyst, selective catalytic reduction ("SCR") catalyst, a filtration component, either catalyzed or uncatalyzed (e.g., a diesel particulate filter ("DPF")), and a cleanup catalyst (e.g., an ammonia oxidation catalyst).

However, aftertreatment systems that include an oxidation catalyst are susceptible to catalyst poisoning, which may occur when the oxidation catalyst is exposed to exhaust gases that include compounds that bind to and, consequently, deactivate the catalyst, preventing the catalyst from effectively treating the exhaust gases. Such catalyst poisoning compounds include sulfur oxides ($SO_x$.) A multifuel engine, such as a dual fuel engine, can use a liquid fuel and a gaseous fuel for operation, such as diesel fuel and natural gas fuel. Diesel and natural gas fuels may contain sulfur in different quantities depending on, for example, the geographic location where the fuel is obtained. After combustion of a fuel containing sulfur, the sulfur is oxidized into $SO_x$ such as $SO_2$ and $SO_3$. The $SO_x$ can be detrimental to many components of the exhaust aftertreatment system, including the oxidation catalyst.

Palladium (Pd) rich oxidation catalysts can be very effective in oxidizing CO and hydrocarbons, such as short chain alkanes, contained in the exhaust gas into innocuous products such as carbon dioxide and water vapor. Commonly found in natural gas, short chain alkanes include methane, propane and ethane, which may be difficult to oxidize in a certain oxidation catalytic devices. Nonetheless, the reactants may include hydrocarbons of all types, such as CO and the soluble organic fraction (SOF) of the diesel particulate matter. The SOF consists of unburned hydrocarbons from fuel and lubricating oil from the engine that have condensed on the solid carbon particles contained in the exhaust gas.

Certain catalysts and catalyst formulations may be more effective at oxidizing particular compounds than others. For example, palladium is a particularly effective oxidizer of short chain alkanes. In certain embodiments and applications, palladium may be more than 80% effective in oxidizing methane. Consequently, the oxidation catalyst disclosed herein may include a downstream oxidizing catalyst of palladium, or combination of oxidizing catalysts with palladium content being dominant, to effectively oxidize CO and hydrocarbons, such as short chain alkanes. While the use of palladium-rich oxidation catalysts can improve the oxidation of short chain alkanes, such oxidation catalysts are highly sensitive to the presence of sulfur byproducts in the exhaust gas. The hydrocarbon oxidation capability of palladium-rich oxidation catalysts deteriorates over time if they are exposed to $SO_x$ in the exhaust gas. An oxidation catalyst that is primarily palladium may suffer a significant reduction in methane conversion capability if it becomes contaminated with sulfur. A mixture of platinum (Pt) and palladium is the most effective composition for achieving high methane conversion efficiency and good resistance to deterioration upon sulfur contamination.

The systems disclosed herein include a downstream oxidation catalyst that may lose its catalytic capability over time due to various deactivation mechanisms, including fouling, poisoning, and sintering. Fouling generally refers to the formation of carbonaceous residues that cover the active sites of the catalyst, which decreases its active surface area, thus decreasing its effectiveness. Sintering generally refers to the agglomeration of the active catalytic species (i.e., the precious metal) under certain operating conditions such as high temperature and high humidity environments. Sintering decreases the effectiveness of the catalyst as active particles migrate and stick together on a crystalline or atomic level, thus reducing the active surface area of the catalytic device.

Catalyst poisoning may occur when the oxidation catalyst is exposed to exhaust gas containing compounds that interact with and/or bind to the active catalytic surfaces of the device, occupying the active catalytic sites and thereby preventing contact with and treatment of the exhaust gas. Another type of catalyst poisoning may be the formation of oxides of the active catalytic species used in the catalytic device, generally referred to as precious metal oxides. The formation of precious metal oxides may be more likely in high temperature, oxygen-rich conditions such as the exhaust gas from a lean-burn engine, where the exhaust gas includes ample quantities of free oxygen at elevated temperatures. Consequently, contaminating compounds may poison and gradually deactivate an oxidation catalyst, and certain types of catalysts may be susceptible to poisoning by certain contaminants. Further, in the case of a multifuel engine operating on diesel fuel, the cooler, lean-mixture environments produced by conventional diesel fuel combustion processes may be particularly susceptible to deactivation by sulfur poisoning, and spontaneous desorption rarely occurs. Moreover, besides the temperature differences, lean mixtures, which include excess oxygen, tend to produce a highly oxidizing environment relative to stoichiometric or rich mixtures, thus yielding more precious metal oxides, such as sulfur oxides, that may poison the oxidation catalyst.

Common catalyst contaminants may include lead, magnesium, silicone, sulfur, and organic compounds of the same. Referring specifically to sulfur poisoning, for example, though palladium is a particularly effective oxidizer of short chain alkanes, palladium is relatively easily poisoned by sulfur by both the deposition of sulfur compounds on the catalytic surface and the formation of sulfur oxides (e.g., $SO_2$, $SO_3$, and/or $SO_4$). Without being held to a specific theory, in the case of a catalytic device that is a palladium-rich oxidation catalyst, it is thought that deactivation is caused by adsorption of sulfur compounds, such as sulfur oxides, onto the palladium particles with eventual spillover of sulfur onto the substrate structure. At relatively low temperatures (i.e., around 240° C.), the adsorption rate of sulfur oxides on the palladium particle and into the substrate may be maximized and thus the deactivation is very rapid. At higher temperatures (i.e., more than about 500° C.), the sulfur oxide adsorption rate on the palladium particles is substantially lower, and any sulfur oxides adsorbed into the substrate begin to desorb resulting in at least partial regeneration of the catalyst. However, raising the exhaust temperature above approximately 800° C. may damage the catalytic device such that performance cannot be recovered. Thus, the catalytic performance of the oxidation catalyst may gradually worsen over time due to poisoning but may be at least partially restored by regenerating the device periodically.

In order to recover highly efficient hydrocarbon oxidation capabilities, the sulfur must be removed from any palladium-rich oxidation catalyst with unacceptably high levels of sulfur contamination, sometimes called catalyst poisoning, or more specifically, sulfur poisoning. Sulfur removal from the oxidation catalyst, or desulfation, may be accomplished by exposing a sulfur contaminated oxidation catalyst to exhaust gas that is devoid of oxygen and that is at a sufficiently high temperature. If desulfation occurs in a lean exhaust environment where the oxygen content is high, bed temperatures in excess of 700° C. may be required to recover the conversion efficiency of the oxidation catalyst. At such high temperatures, particularly those in excess 800° C., there is a potential to permanently damage the oxidation catalyst such that its conversion efficiency cannot be recovered. However, the formation of a net rich environment in the exhaust gas at the inlet to the downstream oxidation catalyst such that there little or no oxygen remaining in the exhaust gas can allow recovery of the oxidation catalyst conversion efficiency at much lower temperatures, such as around 500° C. In one embodiment, conversion efficiency of the oxidation catalyst in a net rich exhaust environment is recovered at temperatures ranging from 400° C. to 600° C. In another embodiment, conversion efficiency of the oxidation catalyst in a net rich exhaust environment is recovered at temperatures ranging from 350° C. to 500° C.

With reference to FIG. 1, a system 10 and associated method, as described herein, is configured to consume or deplete the oxygen out of the exhaust gas upstream of a contaminated palladium-rich, downstream oxidation catalyst to lower desulfation temperatures, reducing or eliminating the risk of damage that may occur with desulfation at higher temperature operating conditions. The system 10 includes an additional oxidation catalyst 28 which is located upstream of a second oxidation catalyst 30 for which desulfation is required. The first, upstream oxidation catalyst 28 is configured to utilize additional hydrocarbons that are provided in the exhaust gas to consume oxygen in the exhaust gas and enable desulfation of the second oxidation catalyst 30 to occur at lower temperatures due to a net rich exhaust environment.

The first, upstream oxidation catalyst 28 may be platinum-rich, such as a platinum only catalyst or a combination of platinum and palladium with the platinum content being higher than the palladium content. The second, downstream oxidation catalyst 30 can be palladium-rich, such as a palladium only catalyst or a combination of palladium and platinum with the palladium content higher than the platinum content. In either the platinum-rich or palladium-rich oxidation catalysts, the presence of materials other than platinum and/or palladium is not precluded, such as iridium, ruthenium, osmium, rhodium (i.e., platinum group metals) and a combination thereof. The structure of oxidation catalysts 28, 30 may include a flow-through monolithic honeycomb substrate, either metallic (e.g., aluminum) or ceramic, coated with an oxidizing catalyst material, such as platinum or palladium, respectively. The honeycomb structure of the oxidation catalyst substrate provides a relatively large surface area of catalyst material to facilitate oxidation of the pollutants.

In one embodiment, system 10 includes an exhaust sensor 32 that is configured to measure an oxygen amount, or any parameter indicative of an oxygen amount, in the exhaust gas. The amount of oxygen in the exhaust gas is used to determine a quantity of hydrocarbons to introduce into the exhaust gas that consumes all or substantially all of the oxygen present in the exhaust gas as it passes through the first oxidation catalyst 28. In addition, a temperature and mass flow rate of the exhaust gas can be used with the oxygen amount to determine the quantity of hydrocarbons for oxygen depletion. The exhaust gas exiting the first oxidation catalyst 28 is devoid of oxygen and has an elevated temperature created by the oxidation reaction in first oxidation catalyst 28 that is sufficient to desulfate the second oxidation catalyst 30.

The embodiment of system 10 in FIG. 1 includes a dual fuel engine 12 with an exhaust aftertreatment system 20. Exhaust gas exits a combustion chamber 14 of cylinder 16 of the dual fuel internal combustion engine 12 through an exhaust conduit 22. The exhaust gas includes some level or amount of oxygen present while the engine 12 is operated with lean conditions. The exhaust sensor 32 may measure or indicate the amount of oxygen present in the exhaust gas and provide an output signal to a controller 42.

The exhaust gas first passes through the platinum-rich first oxidation catalyst 28 and then through the downstream palladium-rich second oxidation catalyst 30. If sulfur is present in the fuels used for operation of engine 12, sulfur contamination or poisoning of oxidation catalyst 28, 30 occurs; however, the second oxidation catalyst 30 with a greater palladium content is more susceptible to sulfur contamination than the platinum-rich upstream oxidation catalyst 28, which has a lesser palladium content and greater platinum content. As sulfur accumulates on second oxidation catalyst 30, the controller 42 determines when to initiate desulfation based on a desulfation triggering event, as discussed further below.

Figure 2:
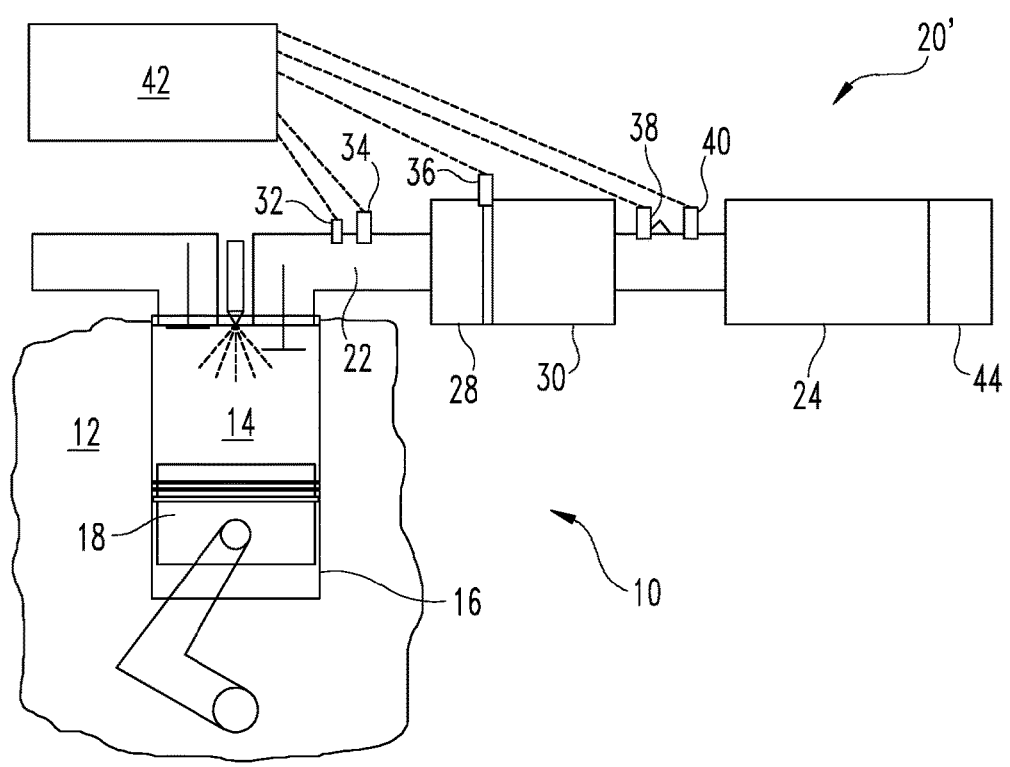
FIG. 2 is a schematic view of another exemplary embodiment of a dual fuel internal combustion engine and aftertreatment system.

In order to introduce the desired quantity of hydrocarbons into the exhaust gas, a hydrocarbon doser 26 to inject hydrocarbons from a hydrocarbon source outside the engine may be employed as part of aftertreatment system 20. As shown in FIG. 2, another embodiment of exhaust aftertreatment system 20 may be constructed without a hydrocarbon doser. In system 20', the desired quantity of hydrocarbons may be introduced to the exhaust gas by a post-combustion injection of hydrocarbons directly or indirectly into a combustion chamber 14 of cylinder 16 of engine 12. In another embodiment, the quantity of hydrocarbons is injected into the exhaust gas by disabling a pilot injection of fuel into combustion chamber 14 to preventing combustion. Then the hydrocarbons are injected into the cylinder 16, or provided upstream of the cylinder 16, to pass uncombusted through combustion chamber 14 and into the exhaust conduit 22. Combinations of these embodiments are also contemplated, in which a hydrocarbon doser 26 is provided with post-combustion or disabled combustion injection of hydrocarbons into or through the cylinder.

The hydrocarbons injected into the exhaust gas pass over the upstream platinum-rich first oxidation catalyst 28 and combine with the oxygen present in the exhaust gas to oxidize over the first oxidation catalyst 28. The reaction is exothermic, so the temperature of the exhaust gas is higher as it exits upstream oxidation catalyst device 28 than when it entered. The amount of oxygen in the exhaust gas measured by exhaust sensor 32 upstream of the first oxidation catalyst device 28, along with the temperature of the exhaust gas and the mass flow rate of the exhaust gas, can be used to determine the stoichiometrically required quantity of hydrocarbons for injection in the exhaust gas to deplete all or substantially all the oxygen in the exhaust gas via the oxidation reaction. As a result, the exhaust gas exiting the first oxidation catalyst device 28 should be substantially free of oxygen. The higher temperature and absence of oxygen in the exhaust gas exiting first oxidation catalyst 28 enables desulfation of downstream palladium-rich second oxidation catalyst 30 at lower exhaust temperatures and without requiring operation of engine 12 at rich conditions.

Figure 3:
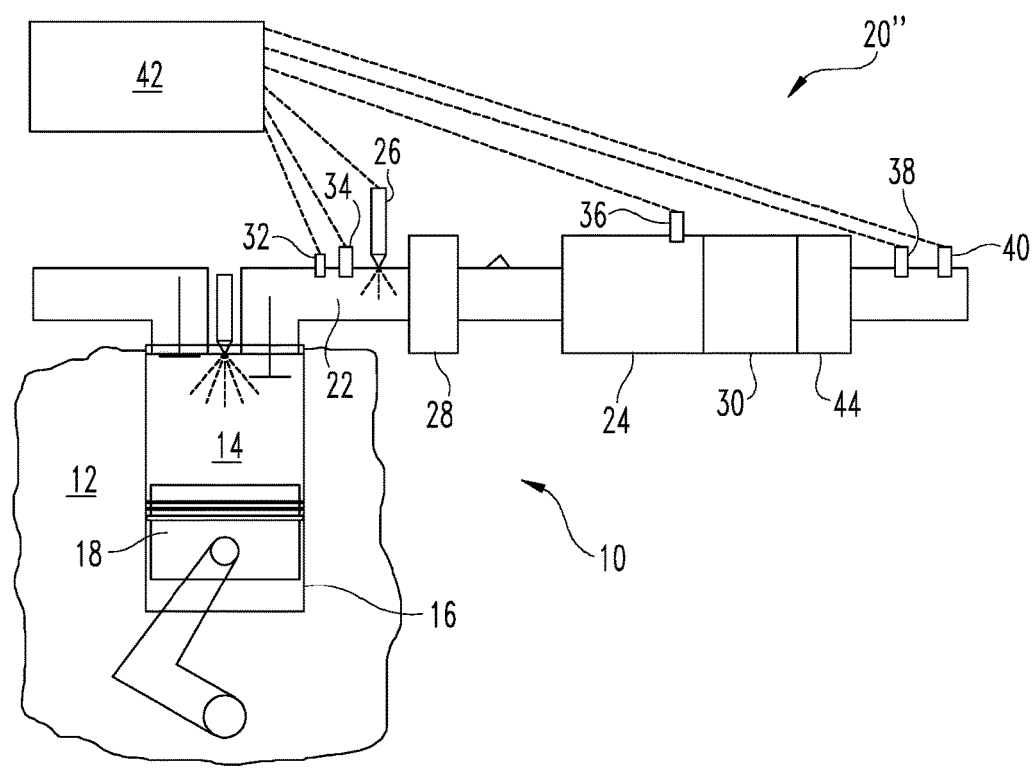
FIG. 3 is a schematic view of yet another exemplary embodiment of a dual fuel internal combustion engine and aftertreatment system.

In the illustrated embodiments of FIGS. 1 and 2, the aftertreatment systems 20, 20' include an SCR device 24 downstream of second oxidation catalyst 30, and an ammonia oxidation catalyst 44 downstream of SCR device 24. The presence of an ammonia oxidation catalyst 44 is optional and non-limiting. As shown in FIG. 3, another embodiment of exhaust aftertreatment system 20" may have the palladium-rich downstream oxidation catalyst device 30 located downstream of the SCR device 24. Other arrangements of the oxidation catalysts 28, 30 relative to one or more of an SCR device, particulate filter, and other aftertreatment components are contemplated herein, including commingling, integrating, or joining one or more of oxidation catalysts 28, 30 with such components.

The exemplary exhaust aftertreatment systems 20, 20', 20" include both an upstream platinum-rich first oxidation catalyst 28 and a downstream palladium-rich second oxidation catalyst 30, and the upstream first oxidation catalyst 28 is configured oxidize a determined quantity of hydrocarbons in the exhaust gas to deplete substantially all the oxygen from the exhaust gas upstream of second oxidation catalyst 30 and elevate exhaust gas temperatures to second oxidation catalyst 22. The oxygen-depleted exhaust gas environment at second oxidation catalyst 30 allows desulfation to be completed at lower exhaust gas temperatures than would be possible in an oxygen-containing exhaust gas environment.

Figure 4:
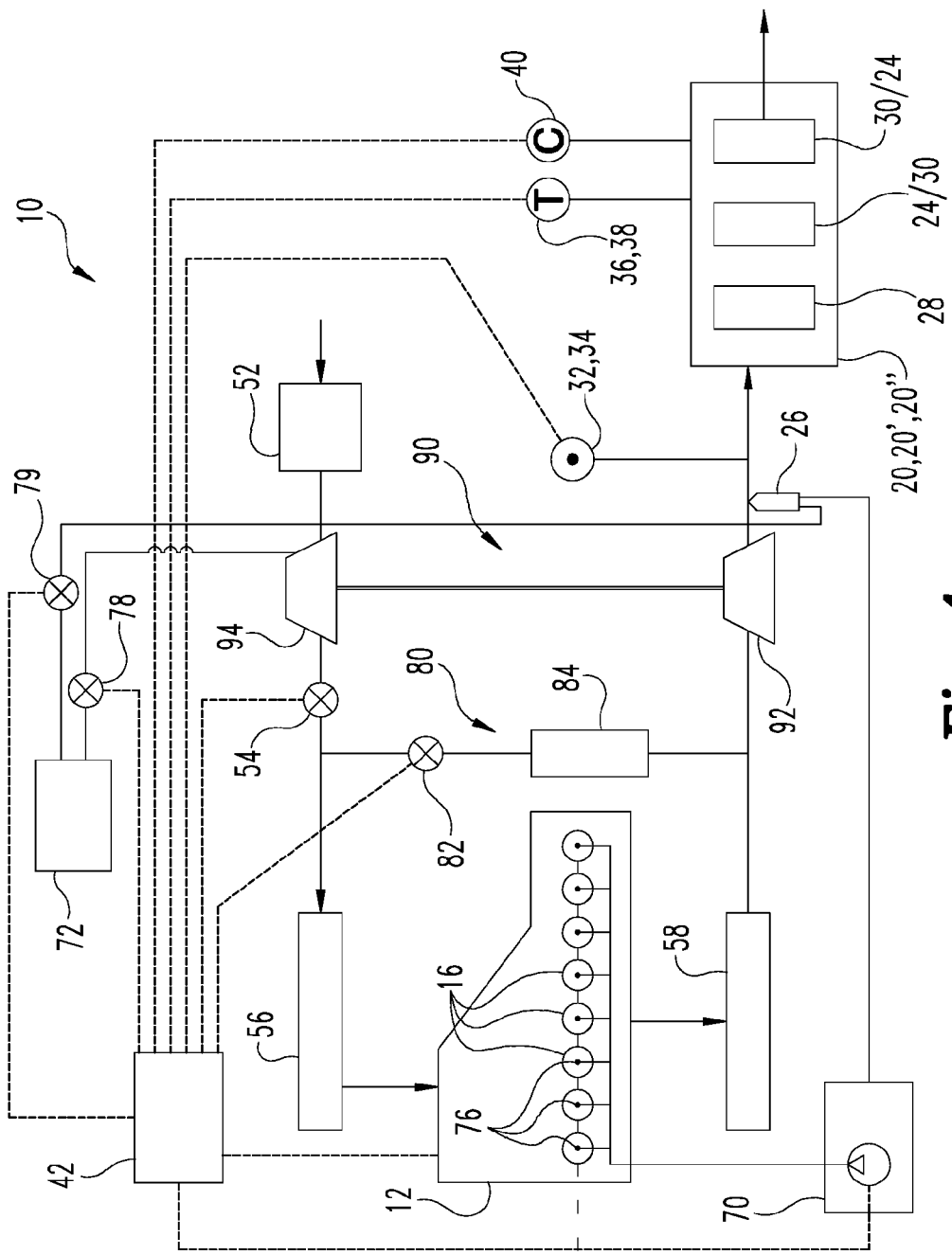
FIG. 4 is another schematic view of the dual fuel internal combustion engine and aftertreatment system of FIGS. 1, 2 and 3.

Further features of the system 10 are shown in FIG. 4, it being understood that not all illustrated features in FIG. 4 are required for system 10, and not all possible features of system 10 are shown. System 10 may include dual fuel internal combustion engine 12 including an air intake 52 upstream of an intake manifold 56, which enable a flow of atmospheric air into the engine 12 for the combustion of a fuel to generate power. The system 10 may further include a throttle 54 disposed upstream of the intake manifold 56 to regulate the flow of air into the engine 12. The throttle 54 may be commanded by controller 42 as described further herein. The engine 12 may have one or more combustion cylinders 16 and pistons 18 (FIGS. 1-3) to generate mechanical power from the combustion of fuel in combustion chamber 14. The engine 12 may be an internal combustion engine, including but not limited to a spark-ignition engine or a compression-ignition engine.

The engine 12 may be a multifuel engine structured to combust two or more different types of fuels. For example, in certain embodiments, the engine 12 may be structured to enable efficient operation using various fuels. For example, the engine 10 may be configured to operate using one or both of a liquid fuel from a first fuel source 70 and a gaseous fuel from a second fuel source 72. In certain embodiments, the engine 12 may be configured to operate using a liquid fuel that is diesel fuel and a gaseous fuel that is natural gas. In at least one embodiment, the engine 12 may be capable of operating on more than two types of fuel, including but not limited to alcohol, synthetic fuels, blends, and lubricating oil. Further, the engine 12 may be structured to operate on any suitable combination of fuel.

In certain embodiments, the engine 12 may operate on straight diesel fuel or a combination of diesel fuel and natural gas. In such an embodiment, for a given cycle of the engine 12 natural gas may be introduced into the cylinders of the engine 12 via the intake manifold 56, similar to a conventional spark-ignition engine (i.e., port injection) or at an inlet of a compressor 94. The flow of gaseous fuel can be regulated by a flow control valve 78 connected to controller 42. Near the end of a compression stroke of the engine 12, diesel fuel may be injected into the cylinder by a fuel injector 76, in addition to the natural gas previously introduced, and ignited like a conventional compression-ignition engine. Combustion of the diesel fuel causes the natural gas to burn. In at least one embodiment, the engine 10 may operate solely on diesel fuel under certain operating conditions (e.g., start-up and/or transient power demands) or on a substitution mixture of diesel and natural gas for diesel fuel. Such an embodiment of engine 12 may be suitable for, but not limited to, such applications as power generation for well drilling and servicing, where natural gas is available on site. In certain embodiments, the substitution rate of a second for a first fuel may be as much as 100% in certain operating conditions, and as low as 0% in other operating conditions.

Regardless of the types of fuel combusted in the engine 12, a total quantity of fuel supplied is mixed with air from the intake manifold 56 according to a predetermined air/fuel ratio. In a conventional multifuel engine at least partially using diesel fuel, the air/fuel ratio is generally a lean mixture, meaning the mixture includes more air (i.e., oxygen) than needed to combust the amount of fuel introduced into the engine. An air/fuel ratio having only enough air to combust the available fuel is commonly called a stoichiometric mixture. Further, an air/fuel ratio having less air than needed to completely burn all the available fuel is commonly called a rich mixture. The system 10 may be operated on mixtures that are lean, stoichiometric, and rich depending on the operating mode of the engine 12.

The system 10 may include an exhaust manifold 58 in fluid communication with the engine 12 to route a flow of exhaust gas out of the engine 12. The exhaust gas is generated by the combustion of the fuel in the engine 12 and may include combustion products such as carbon dioxide and water vapor. The system 10 further includes aftertreatment system 20, 20', 20" (collectively referred to as aftertreatment system 20) in fluid communication with the engine 12 via the exhaust manifold 58 and structured to remove prescribed pollutants from the flow of exhaust gas. The aftertreatment system 20 may include one or more catalytic and/or filtration components known in the art along with the first oxidation catalyst 28 and second oxidation catalyst 30 discussed above. The oxidation catalysts 28, 30 reduce the hydrocarbon levels emitted from engine 12 to meet regulatory levels. Other embodiments of aftertreatment system 20 include one or more of a filtration component (either catalyzed or uncatalyzed), such as a diesel particulate filter, and a $NO_x$ reduction catalyst (e.g., three-way catalyst, lean $NO_x$ catalyst, selective catalytic reduction ("SCR") catalyst, etc.). Example aftertreatment systems 20 may further include a cleanup catalyst (e.g., an ammonia oxidation catalyst 44). In certain embodiments, the $NO_x$ reduction catalyst is an SCR system with an SCR device 24 structured to catalyze $NO_x$ into diatomic nitrogen, carbon dioxide, and water using diesel exhaust fluid ("DEF") as a reductant. The DEF may be stored and dispensed from a doser (not shown), having a finite capacity, in communication with the exhaust gas generated from the engine 12.

The system 10 may further include a turbocharger 90 in communication between the exhaust manifold 58 and the intake manifold 56. The turbocharger 90 may include a turbine 92 in fluid communication with the flow of exhaust gas exiting the exhaust manifold 58. The turbine 92 may be disposed upstream of the aftertreatment system 20 and be structured to convert at least a portion of the energy of the relatively hot and high pressure exhaust gases into a torque. The turbocharger 90 may further include a compressor 94 in fluid communication with the flow of charge gases upstream of the intake manifold 56 and driven by the torque generated by the turbine 92. The compressor 94 may be structured to compress the charge gases and push an increased mass of charge gases through the intake manifold 56 and into the cylinder, thereby increasing the power output of the engine 12 in proportion to the mass of the charge gases pushed into the cylinder 16. In at least one embodiment, the compressor 94 may be disposed upstream of the intake throttle 54. The turbocharger 90 may include, but not be limited to, a multiple stage turbocharger, a variable geometry turbocharger (VGT), or a turbocharger having a wastegate or bypass valve in certain embodiments. Additionally or alternatively, the system 10 may include a mechanically driven supercharger in communication with the intake manifold 56 and capable of pushing compressed charge gases through the intake manifold 56 and into the engine 12. Other embodiments contemplate multiple turbochargers.

In at least one embodiment according to the present disclosure, the system 10 may include an exhaust gas recirculation ("EGR") system 80. The EGR system 80 may be disposed between the exhaust manifold 58 and the intake manifold 56 and may be structured to recirculate at least a portion of the exhaust gas exiting the engine 12 via the exhaust manifold 58 into the intake manifold 56 and back into the engine 12. Exhaust gas routed back into the engine 12 via the EGR system 80 may be referred to as "EGR gas." The EGR system 80 may include an EGR valve 82 structured to regulate and synchronize the flow of exhaust gas through the EGR system 80 and into the intake manifold 56. The EGR system 80 may further include an EGR cooler 84 structured to transfer heat from the exhaust gases routed therethrough. The EGR cooler 84 may be any type of suitable heat exchanger and, by cooling the exhaust gases flowing through the EGR system 80, may both increase the mass of the EGR gas routed back into the intake manifold 56 and lower the temperature of combustion within the engine 12.

In at least one embodiment, the EGR system 80 may include a bypass line (not shown) to selectively bypass the EGR cooler 84 and route uncooled exhaust gases to the intake manifold 56 as desired. Such an embodiment of the EGR system 80 may be effective under low engine load conditions. In embodiments that include the turbocharger 90 and/or the aftertreatment system 20, the EGR system 80 may be positioned between the exhaust manifold 58 and the intake manifold 56 upstream of the turbine 92 and/or the aftertreatment system 20 and downstream of the compressor 94 as shown. Alternatively, the EGR system can be a low pressure EGR system downstream of the turbine 92 and upstream of the compressor 94, or multiple connections that provide both high pressure and low pressure EGR systems.

The aftertreatment system 20 may further include one or more temperature sensors 36, 38 in communication with the flow of exhaust gas through the aftertreatment system 20. The temperature sensor(s) 36, 38 may be any suitable device, including but not limited to a thermocouple, thermistor, and pyrometer. The temperature sensor(s) 36, 38 may be in communication with the controller 42 to provide feedback on the performance of the aftertreatment system 20. For example, the temperature sensor 38 may provide warning information that the aftertreatment system 20 has exceeded a maximum safe operating temperature. Additionally, the temperature sensor 38 may be combined with another temperature sensor 36 positioned upstream of the catalytic components (FIGS. 1-3) to determine whether a measured temperature rise across a given catalytic component indicates that the aftertreatment system 20 is operating properly. In at least one embodiment, the aftertreatment system 20 may include two temperature sensors 36, 38, one positioned immediately upstream of the second oxidation catalyst 30 and another positioned immediately downstream of the oxidation catalyst 30 such that a temperature change across the second oxidation catalyst 30 may be determined by the controller 42 to determine a desulfation triggering event.

The aftertreatment system 20 may further include one or more exhaust sensors 32, 34 in communication with the flow of exhaust gas and the controller 50 to monitor oxygen levels. The exhaust sensor(s) 32, 34 may be disposed between the exhaust manifold 58 and the aftertreatment system 20 to determine the amount of free oxygen in the exhaust gas entering the aftertreatment system 20 as part of a closed-loop control structure. In at least one embodiment, the aftertreatment system 20 may include another oxygen measuring exhaust sensor 32 in communication within the aftertreatment system 20 to provide feedback to the controller 42 on the performance of the aftertreatment system 20. In one example, the exhaust sensor 32 may determine the concentration of oxygen in the exhaust gases as a proxy for the concentration of regulated emissions or as described further herein. In a further example, the exhaust sensor 32 may determine the concentration of oxygen in the exhaust gases as part of a feedback control structure for supplying a quantity of hydrocarbons upstream of first oxidation catalyst 28 to confirm the air/fuel mixture is sufficiently rich to yield little or no oxygen in the exhaust gas downstream of first oxidation catalyst 28.

The aftertreatment system 20 may further include one or more chemical sensors 40 in communication with the flow of exhaust gas and the controller 42 to monitor the concentration of certain chemical species in the exhaust gas. The chemical sensor 40 may be any suitable analytical device that can provide information about the chemical composition of the exhaust gas in the form of a physical signal that is correlated with the concentration of the target chemical species. For example, the chemical sensor 40 may be structured to determine the concentration of short chain alkanes, such as methane, in the exhaust gas. In such an embodiment, the chemical sensor 40 may be disposed downstream of the second oxidation catalyst 30 to indicate whether the second oxidation catalyst 30 is effectively oxidizing such short chain alkanes.

Accordingly, one means of regenerating an oxidation catalyst is a controlled injection of a quantity of hydrocarbons into the exhaust gas and an exothermic reaction upstream of the second oxidation catalyst 30 to increase the temperature the exhaust gas while further depleting the exhaust gas of free oxygen. One means of producing exhaust gas at an elevated temperature and no free oxygen is to oxidize the quantity of injected hydrocarbons on first oxidation catalyst 28 to burn additional fuel in the exhaust gas outside of the engine but upstream of the second oxidation catalyst 30 to consume any free oxygen and raise the temperature of the exhaust gas. Accordingly, under the higher temperature, near or above stoichiometric operating conditions with zero or little free oxygen, desulfation may occur spontaneously as sulfur oxides formed on the second oxidation catalyst 30 desorb in the hot, oxygen-poor conditions and much of the catalyst's performance is restored.

The platinum-rich oxidation catalyst 28 and quantity of injected hydrocarbons enables oxygen-depletion of the exhaust gas and an elevated, but not excessive, temperature for a period that enables desorption of contaminants from the catalytic surface of the second, palladium-rich oxidation catalyst 30 and oxidation of formed catalyst oxides. Such operating conditions may reverse the effects of catalyst poisoning, including sulfur poisoning. Exposing the second oxidation catalyst 30 to a flow of oxygen-depleted exhaust gas causes the sulfur oxides to desorb from the catalytic surfaces. Sulfur oxides desorb from the catalytic surfaces at lower temperatures due to the oxygen-poor conditions created by the exothermic reaction between the hydrocarbons and platinum-rich first oxidation catalyst 28. Further, exposure to oxygen-depleted exhaust gas reduces oxides formed on the catalytic surface. The target exhaust gas temperature for the system 10 may depend on the specific catalyst formulation of the second oxidation catalyst 30. In certain embodiments, the target exhaust gas temperature may be between about 350-500° C. In certain other embodiments, the target exhaust gas temperature may be between about 400-600° C. In at least one embodiment, the target exhaust gas temperature may be around 500° C.

As will be appreciated by the description that follows, the operations described herein to regenerate an oxidation catalyst may be implemented in the controller 40, which may include one or more modules for controlling different aspects of the system 10. In one form the controller 42 is an engine controller. The controller 42 may be comprised of digital circuitry, analog circuitry, or a hybrid combination of both of these types. Also, the controller 42 may be programmable, an integrated state machine, or a hybrid combination thereof. The controller 42 may include one or more Arithmetic Logic Units (ALUs), Central Processing Units (CPUs), memories, limiters, conditioners, filters, format converters, or the like which are not shown to preserve clarity. In one form, the controller 42 is of a programmable variety that executes algorithms and processes data in accordance with operating logic that is defined by programming instructions (such as software or firmware). Alternatively or additionally, operating logic for the controller 42 may be at least partially defined by hardwired logic or other hardware.

The controller 42 may be exclusively dedicated to monitoring and maintaining the performance of the second oxidation catalyst 30. The controller 42 may be further structured to control other parameters of the engine 12, which may include aspects of the engine 12 that may be controlled with an actuator activated by the controller 42. Specifically, the controller 42 may be in communication with actuators and sensors for receiving and processing sensor input and transmitting actuator output signals. Actuators may include, but not be limited to, the throttle 54 and the EGR valve 82. The sensors may include any suitable devices to monitor parameters and functions of the system 10, such as the exhaust sensors 32, 34, temperature sensors 36, 38, and the chemical sensor 40.

In addition to the types of sensors described herein, any other suitable sensors and their associated parameters may be encompassed by the system and methods. Accordingly, the sensors may include any suitable device used to sense any relevant physical parameters including electrical, mechanical, and chemical parameters of the system 10. As used herein, the term "sensors" may include any suitable hardware and/or software used to sense any engine system parameter and/or various combinations of such parameters either directly or indirectly.

In certain embodiments, the controller 42 may include one or more modules structured to functionally execute the operations of the controller 42. The description herein including modules emphasizes the structural independence of the aspects of the controller 42, and illustrates one grouping of operations and responsibilities of the controller 42. Other groupings that execute similar overall operations are understood within the scope of the present application. Modules may be implemented in hardware and/or software on a non-transient computer readable storage medium, and modules may be distributed across various hardware or computer-related components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

The schematic flow descriptions that follow provide illustrative embodiments of performing operations for regenerating an oxidation catalyst. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 5:
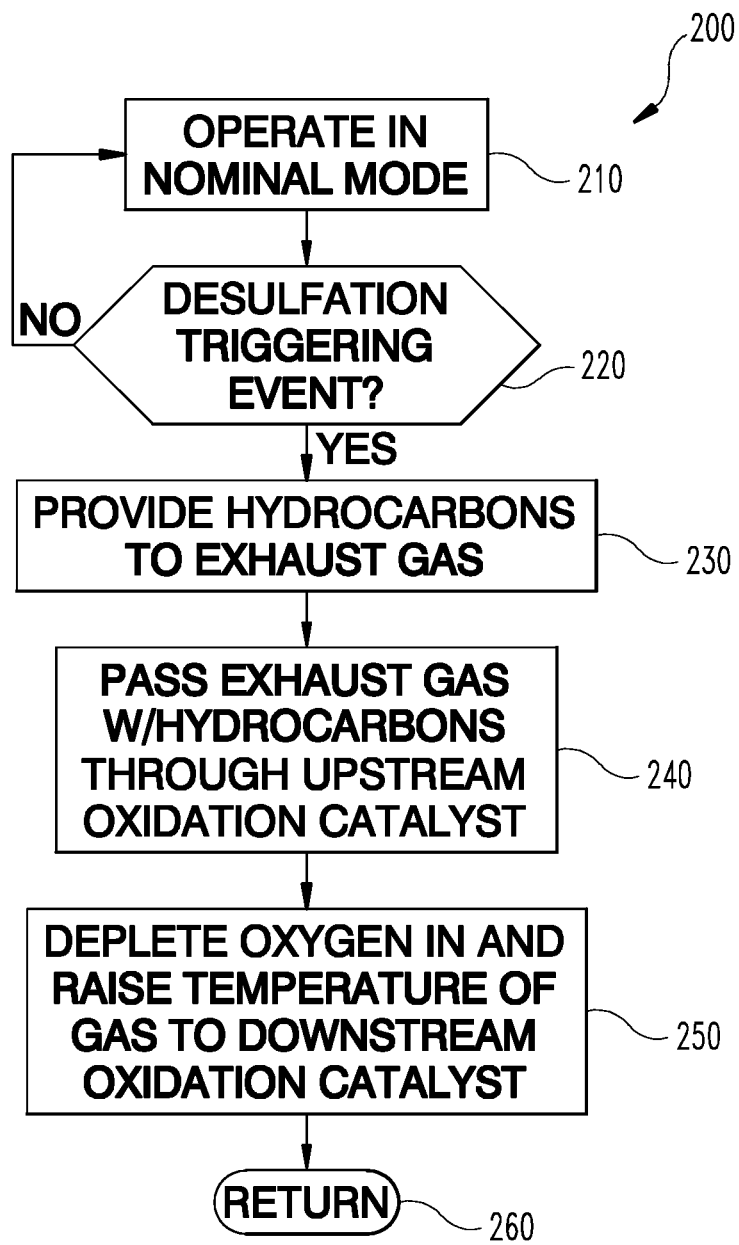
FIG. 5 is a flow diagram of a procedure for desulfating an oxidation catalyst in a dual fuel internal combustion engine system.

As shown in FIG. 5, a method 200 of regenerating an oxidation catalyst according to the present disclosure, such as the second oxidation catalyst 30, may include an operation to periodically provide or inject a quantity of hydrocarbons to the exhaust gas upstream of first oxidation catalyst 28 during a regeneration mode initiated in response to a desulfation triggering event associated with second oxidation catalyst 30. The nominal operating mode may include any suitable set of operating parameters sufficient to meet the desired power output, fuel consumption, and emissions levels of the system 10. In certain embodiments, the nominal operating mode may include a lean air/fuel ratio to cylinders 16 and an oxygen containing exhaust gas flow through oxidation catalysts 28, 30. The regeneration mode may include injecting or providing hydrocarbons into the exhaust gas upstream of first oxidation catalyst 28 so that the exhaust gas has little or no free oxygen after passing through first oxidation catalyst 28.

The regeneration mode may further include hydrocarbons by injection with hydrocarbon doser 26 directly into the exhaust gas downstream of combustion chamber 14 from first fuel source 70 and/or second fuel source 72. Hydrocarbons may also be provided by injecting or providing hydrocarbons from one or both of fuel sources 70, 72, in combustion chamber 14 post-combustion of fuel in the combustion chamber, or in response to a disabled combustion (pilot injection) in cylinder 16, and combinations of these. The hydrocarbons can be provided by the liquid first fuel source 70, the gaseous second fuel source 72, from both sources 72, 74, and/or from an alternate source of hydrocarbons (not shown.) Controller 42 can be structured to control injectors 76 and/or flow control valve 78 for hydrocarbons provided in-cylinder. Controller 42 can also be structured to control doser 26 and/or a flow control valve 79 for injection of hydrocarbons into exhaust conduit 22. The method may further include an operation of returning the engine 12 to the regular operating mode after a prescribed period.

Accordingly, a method 200 of regenerating second oxidation catalyst 30 according to the present disclosure may include an operation 210 of initially operating the engine 12 and aftertreatment system 20 in a nominal, regular operating mode. The method 200 may include periodically adjusting the operating condition of the engine 12 and aftertreatment system 20 from the nominal operating mode into a regeneration mode on a prescribed basis, such as in response to a desulfation triggering event conditional 220 being positive. Adjusting the operating condition to the regeneration mode may include an operation 230 of providing hydrocarbons into the exhaust gas upstream of the first oxidation catalyst 28 in a quantity that substantially depletes the oxygen amount in the exhaust gas, an operation 240 of passing the exhaust gas and hydrocarbons through the first upstream oxidation catalyst 28, and an operation 250 of passing the elevated temperature and oxygen depleted exhaust gas through the second oxidation catalyst 30. The method may further include an operation 260 of returning the engine 12 and aftertreatment system 20 to the regular operating mode after a prescribed period. The prescribed period may be the period of time sufficient to substantially desulfate and/or deoxidize the second oxidation catalyst 30.

The desulfation triggering event may be any parameter related to the degree of sulfur poisoning of the second oxidation catalyst 30. In certain embodiments, a time based triggering event is determined in response to a duration of duel fuel internal combustion engine operation. For example, the desulfation triggering event may be a timer configured to determine the amount of time the engine has been operating relative to a predetermined threshold time. The predetermined threshold time may depend on the characteristics of the engine 12 such as, for example, its thermal capacitance. In at least one embodiment, as a non-limiting example, the predetermined threshold time of the desulfation triggering event may be about every 10 minutes. Alternatively, the predetermined time threshold of the desulfation triggering event may be about every 2 hours. The period of time for desulfation can range from 5 seconds to 5 minutes or more. As the forgoing examples suggest, the desulfation triggering event time threshold and period of time for desulfation may be selected to ensure the oxidation catalyst 30 is substantially desulfated and/or deoxidized.

In certain embodiments, the desulfation triggering event may be an estimate of the degree of sulfation or poisoning of the second oxidation catalyst 30, such as a time and temperature history based triggering event determined in response to a time of operation of the dual fuel internal combustion engine above a temperature threshold, or times of operation at or above various sulfur producing temperature thresholds. In certain embodiments, a predicted sulfur contamination condition triggering event is associated with the second oxidation catalyst 30. For example, an estimate may be based on the duty cycle of the engine 12 since the most recent prescribed period. In such an embodiment, the controller 42 may monitor duty cycle data of the engine 12 and record the durations at which the engine 12 operates under the conditions of the duty cycle to thereby estimate the degree of sulfation or poisoning. The duty cycle may include time at various sulfur producing temperatures, torque demand, engine speed, quantity and type of fuel consumed, and operating time, among other operating parameters.

In alternative embodiments, the desulfation triggering event may be a sensor based triggering event determined in response to a sensor output indicating a sulfur accumulation on the second oxidation catalyst 30 exceeds a threshold amount. For example, a sensed parameter from at least one sensor indicating that the performance of the second oxidation catalyst 30 can be monitored to determine if oxidation catalyst 30 has degraded below a threshold level. The sensed parameter may be any suitable detectable parameter of the system 10 that is indicative of the performance of the second oxidation catalyst 30 as affected by contamination, sulfation, and/or poisoning. In certain embodiments, the sensed parameter may be a temperature rise across the second oxidation catalyst 30 determined from temperatures sensors 36, 38 relative to a threshold value. When functioning properly, the second oxidation catalyst 30 may raise the temperature of the exhaust gas passing therethrough because the oxidation reactions occurring within the second oxidation catalyst 30 are exothermic. The heat energy released by the oxidation of CO and HCs will generally increases the temperature of the exhaust gas. Moreover, poisoning of the second oxidation catalyst 30 reduces its catalytic capacity such that less exhaust gas may be oxidized, which in turn generates less heat energy and lowers the resulting temperature rise of the exhaust gas flowing through the second oxidation catalyst 30. Accordingly, the temperature rise across the second oxidation catalyst 30 may decrease over time as the second oxidation catalyst 30 becomes poisoned. Thus, the temperature rise across the second oxidation catalyst 30, as determined by the one or more temperature sensors 36, 38, may be indicative of the performance of the second oxidation catalyst 30 and may be exploited to initiate the regeneration mode.

In certain embodiments, the sensed parameter may be the presence of HCs in the exhaust gas downstream of the second oxidation catalyst 30 exceeding a threshold value. In such embodiments, the chemical sensor 40 may be used to determine whether an increasing concentration of HCs are passing through the second oxidation catalyst 30 untreated (i.e., not oxidized). Such an increase may be indicative of poisoning of second oxidation catalyst 30, requiring initiation of the regeneration mode.

In alternative embodiments, a desulfation triggering event is determined in response to an intrusive diagnostic of the second oxidation catalyst 30. The intrusive diagnostic may include operating the engine 12 in an evaluation mode for a period of time and monitoring a change in exhaust gas composition during the period before reverting to the regular operating mode. The evaluation mode may include any suitable operating conditions that enable a determination of the performance of the second oxidation catalyst 30. As a non-limiting example, the evaluation mode may include skipping an ignition cycle in one cylinder of the engine 12 to increase a concentration of unburned fuel (i.e., HCs) in the exhaust gas. The response of the oxidation catalyst 30 to the increased concentration of HCs may then be monitored to assess its performance. In such an embodiment, the second oxidation catalyst 30 may be monitored by any suitable means including the means disclosed herein.

Namely, for example, the temperature rise or concentration of HCs across the second oxidation catalyst 30 may be monitored. Accordingly, use of the intrusive diagnostic to assess the performance of the second oxidation catalyst 30 may enable a well-defined evaluation period to clearly delineate an actual response of the second oxidation catalyst 30 from a desired response, thereby providing a measurable evaluation of the second oxidation catalyst 30.

A variety of aspects according to the present disclosure are contemplated that may be employed in a variety of methods, processes, procedures, steps, and operations as a means of controlling desulfation of an oxidation catalyst. According to one aspect, a method includes operating a dual fuel internal combustion engine including an exhaust aftertreatment system to produce an exhaust gas containing an amount of oxygen, the exhaust aftertreatment system including an SCR device, a first oxidation catalyst, and a second oxidation catalyst downstream of the first oxidation catalyst; interpreting a desulfation triggering event associated with the second oxidation catalyst; introducing a quantity of hydrocarbons into the exhaust gas upstream of the first oxidation catalyst in response to the desulfation triggering event, wherein the quantity of hydrocarbons is determined in response at least in part to the amount of oxygen in the exhaust gas; and passing the quantity of hydrocarbons and exhaust gas through the first oxidation catalyst to elevate a temperature of and reduce the amount of oxygen in the exhaust gas at the second oxidation catalyst.

In one embodiment, the desulfation triggering event includes at least one of: a time based desulfation triggering event determined in response to a duration of duel fuel internal combustion engine operation; a time and temperature history based desulfation triggering event determined in response to a time of operation of the duel fuel internal combustion engine above a temperature threshold; a sensor based desulfation triggering event determined in response to a sensor output indicating a sulfur accumulation on the second oxidation catalyst exceeds a threshold amount; a predicted sulfur contamination condition desulfation triggering event associated with the second oxidation catalyst; and an estimated sulfur contamination condition desulfation triggering event determined in response to an intrusive diagnostic of the second oxidation catalyst.

In another embodiment, introducing the quantity of hydrocarbons includes injecting the quantity of hydrocarbons into at least one cylinder of the dual fuel internal combustion engine post-combustion of fuel in the at least one cylinder so the quantity of hydrocarbons are carried in the exhaust gas to the first oxidation catalyst. In a refinement of this embodiment, introducing the quantity of hydrocarbons includes injecting a liquid fuel into the at least one cylinder post-combustion of the fuel. In a further refinement, introducing the quantity of hydrocarbons includes injecting a gaseous fuel into the at least one cylinder post-combustion of the fuel.

In another embodiment, introducing the quantity of hydrocarbons includes disabling a pilot injection of a diesel fuel into at least one cylinder of the dual fuel internal combustion engine and providing a gaseous fuel to the at least one cylinder after disabling the pilot injection, wherein the gaseous fuel passes through the at least one cylinder to the first oxidation catalyst. In yet another embodiment, introducing the quantity of hydrocarbons includes injecting at least one of a liquid fuel and a gaseous fuel into an exhaust conduit upstream of the first oxidation catalyst.

In another embodiment, the first oxidation catalyst is platinum-rich and the second oxidation catalyst is palladium-rich. In a refinement of this embodiment, the first oxidation catalyst includes an amount of palladium, and an amount of platinum in the first oxidation catalyst is greater than the amount of palladium. In another refinement, the second oxidation catalyst includes an amount of platinum, and an amount of palladium in the second oxidation catalyst is greater than the amount of platinum.

In another embodiment, the first oxidation catalyst and the second oxidation catalyst are both upstream of the SCR device. In yet another embodiment, the first oxidation catalyst is upstream of the SCR device and the second oxidation catalyst is downstream of the SCR device. In another embodiment, the quantity of hydrocarbons elevates the temperature of the exhaust gas to the second oxidation catalyst to a temperature range between 400° C. and 600° C.

According to another aspect, a system includes a dual fuel internal combustion engine operable to produce an exhaust gas by combustion of at least one of a liquid fuel and a gaseous fuel and an exhaust aftertreatment system for receiving the exhaust gas. The exhaust aftertreatment system includes at least one SCR device, a first oxidation catalyst, and a second oxidation catalyst downstream of the first oxidation catalyst. At least one sensor associated with the duel fuel internal combustion engine and the aftertreatment system is provided with a controller. The controller is structured to interpret a desulfation triggering event associated with the second oxidation catalyst in response to an input received from the at least one sensor and, in response to the desulfation triggering event, provide hydrocarbons in the exhaust gas in a quantity sufficient to reduce an oxygen amount in the exhaust gas and elevate a temperature of the exhaust gas to the second oxidation catalyst by passing the exhaust gas and hydrocarbons through the first oxidation catalyst.

In one embodiment, the controller is structured to provide the hydrocarbons in the exhaust gas by controlling an injection of at least one of the liquid fuel and the gaseous fuel into at least one combustion chamber of the dual fuel internal combustion engine to occur post-combustion in the at least one combustion chamber so the at least one of the liquid fuel and the gaseous fuel is carried in the exhaust gas to the first oxidation catalyst. In another embodiment, the controller is structured to provide the hydrocarbons in the exhaust gas by controlling an injection of each of the liquid fuel and the gaseous fuel into at least one combustion chamber of the dual fuel internal combustion engine to occur post-combustion in the at least one combustion chamber so the liquid fuel and the gaseous fuel are carried in the exhaust gas to the first oxidation catalyst.

In another embodiment, the controller is structured to provide the hydrocarbons in the exhaust gas by disabling a pilot injection of the liquid fuel in at least one combustion chamber of the dual fuel internal combustion engine and controlling an injection of the gaseous fuel into the at least one combustion chamber to occur after disabling the pilot injection so the gaseous fuel is carried in the exhaust gas to the first oxidation catalyst. In yet another embodiment, the controller is structured to provide the hydrocarbons in the exhaust gas by controlling injection of at least one of the liquid fuel and the gaseous fuel into an exhaust conduit upstream of the first oxidation catalyst.

In another embodiment, the controller is structured to determine the quantity of hydrocarbons in response to an oxygen amount in the exhaust gas, a temperature of the exhaust gas, and a mass flow rate of the exhaust gas. In yet another embodiment, the controller is structured to interpret the desulfation triggering event in response to at least one of:

a time based desulfation triggering event in response to a duration of operation of the duel fuel internal combustion engine; a time and temperature history based desulfation triggering event in response to a time of operation of the duel fuel internal combustion engine above a temperature threshold; a sensor based desulfation triggering event in response to a sensor output indicating a sulfur accumulation on the second oxidation catalyst exceeds a threshold amount; a predicted sulfur contamination condition desulfation triggering event associated with the second oxidation catalyst; and an estimated sulfur contamination condition desulfation triggering event in response to an intrusive diagnostic of the second oxidation catalyst.

In another embodiment of the system, the first oxidation catalyst is platinum-rich and the second oxidation catalyst is palladium-rich. In a refinement of this embodiment, the first oxidation catalyst includes an amount of palladium, and an amount of platinum in the first oxidation catalyst is greater than the amount of palladium. In another refinement, the second oxidation catalyst includes an amount of platinum, and an amount of palladium in the second oxidation catalyst is greater than the amount of platinum.

In another embodiment, the first oxidation catalyst and the second oxidation catalyst are both upstream of the SCR device. In yet another embodiment, the first oxidation catalyst is upstream of the SCR device and the second oxidation catalyst device is downstream of the SCR device.

According to another aspect, a method includes operating a dual fuel internal combustion engine including an exhaust aftertreatment system having a first oxidation catalyst and a second oxidation catalyst device downstream of the first oxidation catalyst, where the first oxidation catalyst is platinum-rich and the second oxidation catalyst is palladium-rich; interpreting a desulfation triggering event associated with the second oxidation catalyst; and desulfating the second oxidation catalyst in response to the desulfation triggering event. Desulfating the second oxidation catalyst includes providing hydrocarbons to an exhaust gas produced by operating the dual fuel internal combustion engine upstream of the first oxidation catalyst and elevating a temperature of the exhaust gas to the second oxidation catalyst by passing the hydrocarbons and exhaust gas through the first oxidation catalyst.

In one embodiment, providing the hydrocarbons includes providing the hydrocarbons in a quantity that depletes an oxygen amount in the exhaust gas upstream of the second oxidation catalyst by an oxidation reaction in the first oxidation catalyst. In another embodiment, providing hydrocarbons includes injecting the hydrocarbons into at least one cylinder of the dual fuel internal combustion engine post-combustion of a fuel in the at least one cylinder so the hydrocarbons are carried in the exhaust gas to the first oxidation catalyst. In a refinement of this embodiment, providing hydrocarbons includes injecting a liquid fuel into the at least one cylinder post-combustion of the fuel. In another refinement, providing hydrocarbons includes injecting a gaseous fuel into the at least one cylinder post-combustion of the fuel.

In another embodiment, providing the hydrocarbons includes disabling a pilot injection of a diesel fuel into at least one cylinder of the dual fuel internal combustion engine and providing a gaseous fuel to the at least one cylinder after disabling the pilot injection so the gaseous fuel passes through the at least one cylinder to the first oxidation catalyst. In yet another embodiment, providing hydrocarbons includes injecting at least one of a liquid fuel and a gaseous fuel into an exhaust conduit between upstream of the first oxidation catalyst.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. Indeed, this disclosure is not intended to be exhaustive or to limit the scope of the disclosure.

What is claimed is:

1. A method comprising:
   operating a dual fuel internal combustion engine including an exhaust aftertreatment system to produce an exhaust gas containing an amount of oxygen, the exhaust aftertreatment system including a selective catalytic reduction (SCR) device, a first oxidation catalyst, and a second oxidation catalyst downstream of the first oxidation catalyst, wherein the first oxidation catalyst includes an amount of palladium, and an amount of platinum in the first oxidation catalyst is greater than the amount of palladium, and the second oxidation catalyst includes an amount of platinum, and an amount of palladium in the second oxidation catalyst is greater than the amount of platinum;
   interpreting a desulfation triggering event associated with the second oxidation catalyst;
   introducing a quantity of hydrocarbons into the exhaust gas upstream of the first oxidation catalyst in response to the desulfation triggering event, wherein the quantity of hydrocarbons is determined in response at least in part to the amount of oxygen in the exhaust gas; and
   passing the quantity of hydrocarbons and exhaust gas through the first oxidation catalyst to elevate a temperature of and reduce the amount of oxygen in the exhaust gas at the second oxidation catalyst, wherein the quantity of hydrocarbons that are passed depletes all of the oxygen in the exhaust gas upstream of the second oxidation catalyst by an oxidation reaction in the first oxidation catalyst.

2. The method of claim 1, wherein the desulfation triggering event includes at least one of:
   a time based desulfation triggering event determined in response to a duration of duel fuel internal combustion engine operation;
   a time and temperature history based desulfation triggering event determined in response to a time of operation of the duel fuel internal combustion engine above a temperature threshold;
   a sensor based desulfation triggering event determined in response to a sensor output indicating a sulfur accumulation on the second oxidation catalyst exceeds a threshold amount;
   a predicted sulfur contamination condition desulfation triggering event associated with the second oxidation catalyst; and
   an estimated sulfur contamination condition desulfation triggering event determined in response to an intrusive diagnostic of the second oxidation catalyst.

3. The method of claim 1, wherein introducing the quantity of hydrocarbons includes injecting the quantity of hydrocarbons into at least one cylinder of the dual fuel internal combustion engine post-combustion of fuel in the at least one cylinder so the quantity of hydrocarbons are carried in the exhaust gas to the first oxidation catalyst.

4. The method of claim 3, wherein introducing the quantity of hydrocarbons includes injecting a liquid fuel into the at least one cylinder post-combustion of the fuel.

5. The method of claim 3, wherein introducing the quantity of hydrocarbons includes injecting a gaseous fuel into the at least one cylinder post-combustion of the fuel.

6. The method of claim 1, wherein introducing the quantity of hydrocarbons includes disabling a pilot injection of a diesel fuel into at least one cylinder of the dual fuel internal combustion engine and providing a gaseous fuel to the at least one cylinder after disabling the pilot injection, wherein the gaseous fuel passes through the at least one cylinder to the first oxidation catalyst.

7. The method of claim 1, wherein introducing the quantity of hydrocarbons includes injecting at least one of a liquid fuel and a gaseous fuel into an exhaust conduit upstream of the first oxidation catalyst.

8. The method of claim 1, wherein the first oxidation catalyst and the second oxidation catalyst are both upstream of the SCR device.

9. The method of claim 1, wherein the first oxidation catalyst is upstream of the SCR device and the second oxidation catalyst is downstream of the SCR device.

10. The method of claim 1, wherein the quantity of hydrocarbons elevates the temperature of the exhaust gas to the second oxidation catalyst to a temperature range between 400° C. and 600° C.

11. A method comprising:
operating a dual fuel internal combustion engine including an exhaust aftertreatment system having a first oxidation catalyst and a second oxidation catalyst device downstream of the first oxidation catalyst, wherein the first oxidation catalyst includes an amount of palladium, and an amount of platinum in the first oxidation catalyst is greater than the amount of palladium, and the second oxidation catalyst includes an amount of platinum, and an amount of palladium in the second oxidation catalyst is greater than the amount of platinum;

interpreting a desulfation triggering event associated with the second oxidation catalyst; and desulfating the second oxidation catalyst in response to the desulfation triggering event, wherein desulfating the second oxidation catalyst includes providing hydrocarbons to an exhaust gas produced by operating the dual fuel internal combustion engine upstream of the first oxidation catalyst and elevating a temperature of the exhaust gas to the second oxidation catalyst by passing the hydrocarbons and exhaust gas through the first oxidation catalyst, wherein providing the hydrocarbons includes providing the hydrocarbons in a quantity that depletes all of the oxygen in the exhaust gas upstream of the second oxidation catalyst by an oxidation reaction in the first oxidation catalyst.

12. The method of claim 11, wherein providing hydrocarbons includes injecting the hydrocarbons into at least one cylinder of the dual fuel internal combustion engine post-combustion of a fuel in the at least one cylinder so the hydrocarbons are carried in the exhaust gas to the first oxidation catalyst.

13. The method of claim 12, wherein providing hydrocarbons includes injecting a liquid fuel into the at least one cylinder post-combustion of the fuel.

14. The method of claim 12, wherein providing hydrocarbons includes injecting a gaseous fuel into the at least one cylinder post-combustion of the fuel.

15. The method of claim 11, wherein providing the hydrocarbons includes disabling a pilot injection of a diesel fuel into at least one cylinder of the dual fuel internal combustion engine and providing a gaseous fuel to the at least one cylinder after disabling the pilot injection, wherein the gaseous fuel passes through the at least one cylinder to the first oxidation catalyst.

16. The method of claim 11, wherein providing hydrocarbons includes injecting at least one of a liquid fuel and a gaseous fuel into an exhaust conduit between upstream of the first oxidation catalyst.

* * * * *